April 13, 1937.  D. M. GERACE, JR  2,077,317
CONVEYER CURRENT CARRIER
Filed Nov. 27, 1935  2 Sheets-Sheet 1

Dominic M. Gerace, Jr.
INVENTOR
BY Victor J. Evans & Co.
ATTORNEY

April 13, 1937.    D. M. GERACE, JR    2,077,317
CONVEYER CURRENT CARRIER
Filed Nov. 27, 1935    2 Sheets-Sheet 2
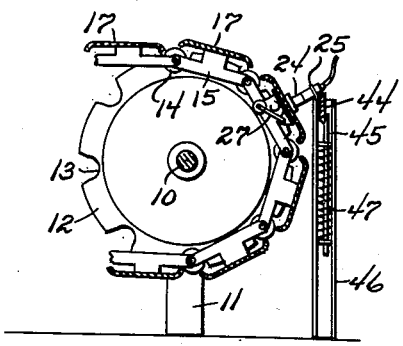
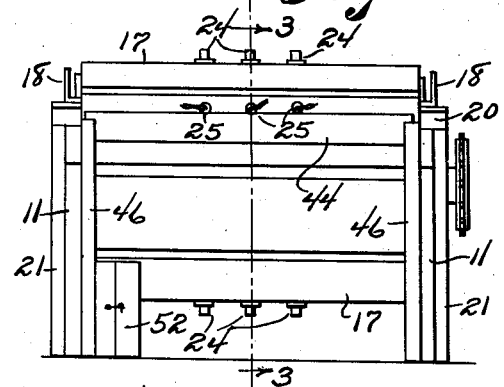
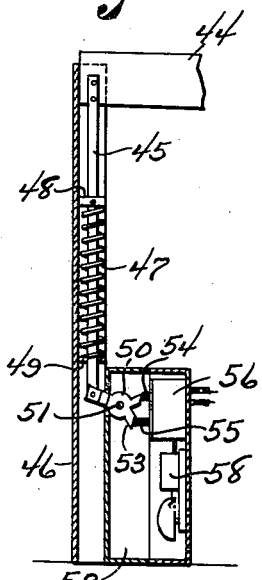
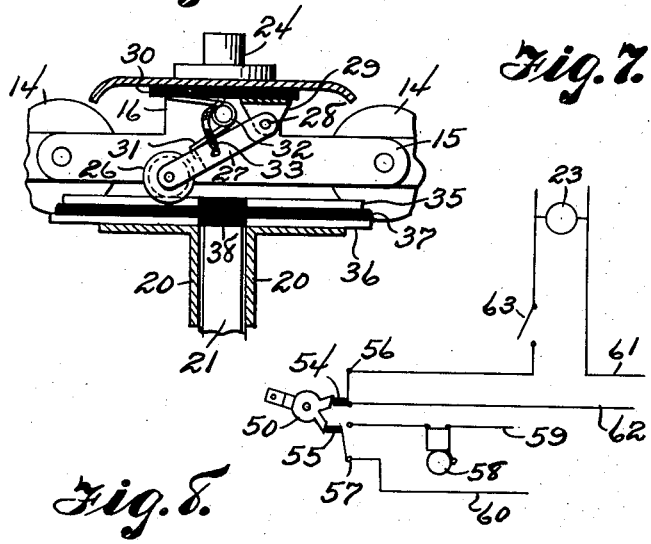
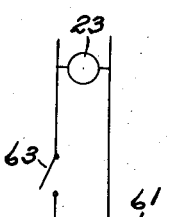
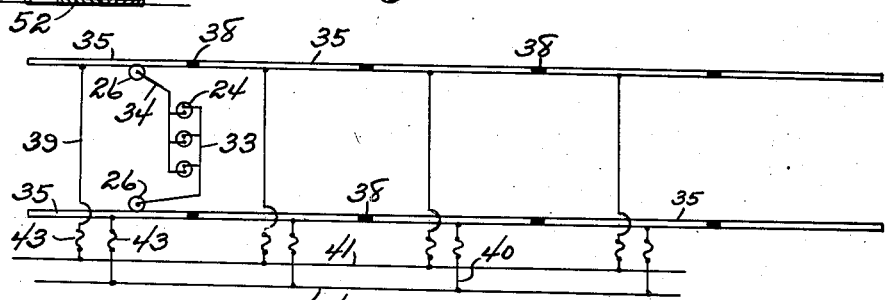
Dominic M. Gerace, Jr. INVENTOR
BY Victor J. Evans & Co.
ATTORNEY Patented Apr. 13, 1937

2,077,317

UNITED STATES PATENT OFFICE 2,077,317

CONVEYER CURRENT CARRIER

Dominic M. Gerace, Jr., Norfolk, Va.

Application November 27, 1935, Serial No. 51,892

4 Claims. (Cl. 198—1)

This invention relates to current carriers for endless conveyers and has for an object to provide plug connectors and trolleys movable with the conveyer to eliminate the use of the long extension cords for portable electric motors and lights now used on moving conveyers in the manufacture and assembly of automobile bodies.

At present the plug receptacles are mounted on a conduit disposed laterally of the conveyer and thus it is necessary for the workman to have from fifty to ninety feet of cord trailing him when he enters a car to perform his operation. The cord as a rule tangles in the moving conveyer or tangles with the cords of other operators and the result is that plugs are torn forcibly from the receptacles, fuses are blown, cords are damaged and often the motors themselves are damaged.

The present invention eliminates the above disadvantages by providing receptacles at intervals on the slats of the conveyer, the car body being run over the slat carrying a plurality of the receptacles so that the receptacles are immediately beneath the cowl and instrument panel. Thus the operator may plug in underneath the body when he enters the body to perform his operation and may pull out at the completion of his operation, only twenty-five feet or less of cord being necessary to give the operator access to any part of the body.

Should any of the plugs be inadvertently left plugged into the receptacles when the body reaches the end of the conveyer, means are provided, operated by such plugs, to open the circuit of the motor which moves the conveyer, so that the conveyer is automatically brought to a halt, and to simultaneously sound an alarm or energize any other type of warning, so that no damage will be done to the plugs or electrical apparatus.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 3 is a detail longitudinal sectional view taken on the line 3—3 of Figure 4 and showing the motor circuit breaker mechanism being operated by a plug inadvertently left plugged in.

Figure 4 is an end elevation of the parts shown in Figure 3.

Figure 5 is a detail sectional view showing the control switch for the operating motor of the endless conveyer and showing the alarm device and the plug operated push rod for controlling the switch.

Figure 6 is a detail longitudinal sectional view showing one of the trolleys and contiguous current supply devices and their mountings.

Figure 7 is a diagrammatic view of the electric circuits and the control switch for the conveyer and alarm.

Figure 8 is a diagrammatic view of the electric circuits for the portable workmen's motors and lights.

Figure 1:
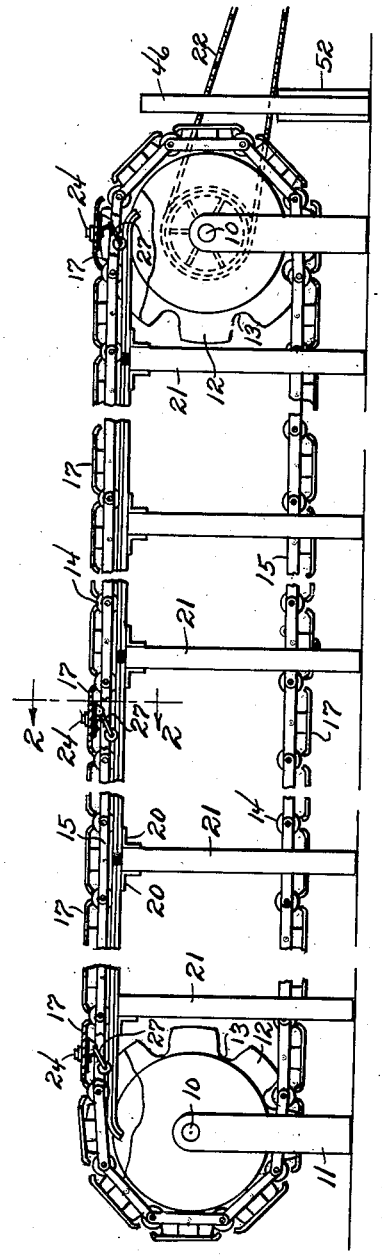
Figure 1 is a side elevation of a conventional conveyer used in the manufacture and assembly of automobiles, with the invention applied thereto.

Referring now to the drawings in which like characters of reference designate similar parts in the various views, the conventional endless conveyer used in automobile manufacture and assembly is shown. The conveyer comprises shafts 10 which are supported upon standards 11 and carry sprocket wheels 12 having notches 13 to receive the rollers 14 of the links 15. Each link is equipped with a bracket 16, best shown in Figures 2 and 6, each two opposite brackets supporting the ends of an associated slat 17.

Figure 2:
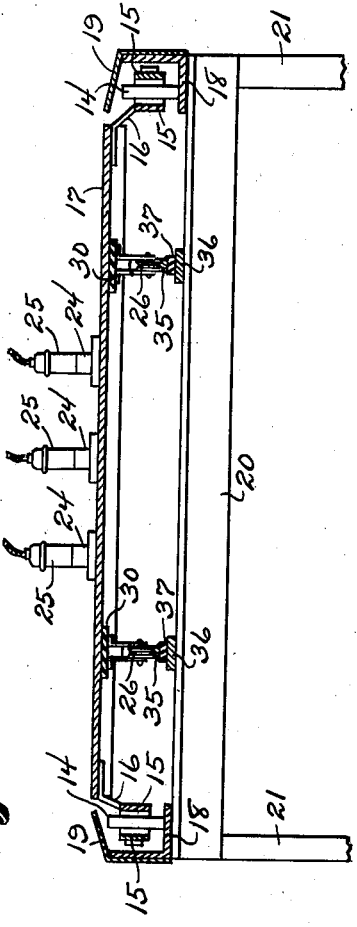
Figure 2 is a cross sectional view taken on the line 2—2 of Figure 1.

The rollers 14 are supported upon a track 18 having an inclined shield 19, best shown in Figure 2, to deflect falling bolts, screws, and the like, from the path of the rollers. The track is supported upon angle cross bars 20 carried by posts 21. In practice the automobile bodies, for instance, are run upon the slats and when the endless carrier is advanced by a sprocket chain drive 22, or other drive, actuated by a motor 23, the bodies are carried along while workmen with portable motor driven tools and with suitable lights, perform their operations upon the bodies.

In carrying out the invention, every twenty-fifth slat, or slats at intervals of about thirteen feet apart, are equipped with a plurality of receptacles 24 into which may be plugged the plugs 25 of the portable motors and lights used by the workmen. Upon the underneath face of each slat equipped with the receptacles is mounted a pair of trolley wheels 26 carried by respective trolley arms 27 which are pivoted at the upper ends, as shown at 28, on brackets 29 which latter are insulated from the slats 17 by a block 30 of insulating material. The trolley wheels are spring pressed downwardly by means of helical springs 31 which surround pins 32 carried by the brackets 16, the ends of each spring bearing respectively upon the associated block 30 of insulating material and associated trolley arm 27. Conductor wires 33 and 34 connect the receptacles 24 in series with the opposite trolleys, as best shown in Figure 8.

Bus bars 35, of substantially triangular cross section, are supported upon bars 36 that are supported upon the cross bars 20 and underlie the trolley wheels. The bus bars are insulated from the bars 36 by strips 37 of insulating material. The bus bars 35 are each formed of a plurality of sections insulated from each other at their adjacent ends, as shown at 38 in Figure 8. Conductor wires 39 and 40 connect opposite sections with the current supply wires 41 and 42, the wires 39 and 40 being provided with fuses 43.

When an automobile body is run upon the endless carrier it is halted on a pair of the sections in such position that the receptacles 24 are disposed below the cowl and instrument panel. The workmen may now plug their lights and tool operating motors into the receptacles 24, it being necessary to employ only twenty-five feet or less of cord to give the workmen access to any part of the body. The circuit for the workmen's motors and the like may be traced from the line wire 42, wire 40, trolleys 26, receptacles 24, and wire 39 to the line wire 41. The carrier is being advanced while the operators are performing their operations upon the car body and in due course the trolley wheels 26 will pass on to the insulating blocks 38 of the trolley wires and open the circuit through the receptacles. When the car body advances over the next succeeding opposite sections of the bus bars the next crew of workmen may plug in their motor operated tools and perform their specific operations on the car body. This is continued until the car body reaches the end of the carrier.

It is necessary that all motor operated tools and lights be disconnected from the receptacles when work upon the car body has been completed and the car body reaches the end of the carrier. In the event, however, that one or more plugs have been inadvertently left plugged into the receptacles such plugs will automatically halt the conveyer and sound an alarm. For this purpose, it will be seen by referring to Figures 3, 4, and 5, that a cross bar 44 is disposed in the path of the plugs left plugged into the receptacles at the discharge end of the endless carrier. The cross bar is equipped at the ends with rods 45 which extend downwardly in the channels of channel iron posts 46. Each rod is equipped with a helical spring 47 which bears against a collar 48 on the rod and against a stationary abutment 49 on the post and normally holds the cross bar 44 at its upper limit of movement.

The lower end of one of the rods 45 is pivotally connected to a lever 50 which is pivoted as shown at 51 on the wall of a housing 52. The lever 50 is provided with diverging fingers 53 adapted to engage the push buttons 54 and 55 of switches 56 and 57, which control respectively the actuating motor 23 of the carrier and an alarm such as a bell 58.

When the bar 44 is at its upper limit of movement the lever 50 will be in position to depress the button 54 of the motor controlling switch and hold the circuit to the motor 23 closed. However should a plug 25 be left plugged into one of the receptacles 24, as shown in Figure 3, the plug will impinge against the bar 44 and move the bar downwardly against the tension of the controlling springs 47. During downward movement of the cross bar the rod 45 associated with the switch lever 50 will swing the lever so that the button 54 of the motor controlling switch is released to open the motor circuit and halt the carrier and the button 55 of the alarm circuit is depressed to close the alarm circuit and sound the alarm.

The motor circuit will be held open until the plug is removed from the receptacle, whereupon the springs 47 return the cross bar 44 to neutral position in which position the switch lever 55 is returned to initial position to depress the button 54 of the motor controlling circuit and hold the motor circuit closed, the lever meanwhile releasing the button 55 to open the switch 57 which controls the alarm circuit.

A conventional wiring diagram for the alarm and motor circuit is shown in Figure 7 in which 59 and 60 designate the alarm circuit wires and 61 and 62 designate the motor circuit wires. The usual manually operated switch 63 is interposed in the motor circuit to start and stop the carrier.

Since the operation has been described as the description of the parts progressed, it is thought that the construction and operation of the invention will be fully understood without further explanation.

What is claimed is:

1. The combination with an automobile assembling endless carrier, of a motor for actuating the carrier, plug-in connecters for electric current comprising plugs and receptacles disposed at intervals on the carrier and movable as a unit with the carrier, means for supplying current to the connecters, and means adapted to be operated by the plugs of the connecters to open the motor circuit and halt the carrier.

2. The combination with an automobile assembling endless carrier, of plug-in connecters comprising plugs and receptacles disposed at intervals on the carrier, trolleys on the carrier electrically connected to the connecters, bus bars underneath the upper reach of the carrier engaging the trolleys, a yielding bar at the end of the carrier in the path of the plugs of the connecters and adapted to be displaced by said plugs, a motor for actuating the carrier, and a switch controlling the motor circuit and operatively connected to the bar to open the motor circuit when the bar is depressed.

3. The combination with an automobile assembling endless carrier, of a plurality of plug-in connecters comprising plugs and receptacles disposed at intervals on the carrier and movable as a unit with the carrier, a motor for actuating the carrier, an alarm, electric circuits for the motor and for the alarm, a switch adapted to open one of said circuits and close the other of said circuits, a spring controlled member in the path of the plugs of the connecters and adapted to be struck by the plugs, and an operative connection between the member and the switch adapted to open the motor circuit and close the alarm circuit when the member is displaced by the plugs against the tension of its controlling spring.

4. The combination with an automobile assembling endless carrier, of means for actuating the carrier, plug in connecters for electric current comprising plugs and receptacles disposed at intervals on the carrier and movable as a unit with the carrier, means for supplying current to the connecters, and means adapted to be operated by the plugs of the connecters to control said actuating means to halt the carrier.

DOMINIC M. GERACE, Jr.